United States Patent
Xu et al.

(10) Patent No.: US 10,007,051 B2
(45) Date of Patent: Jun. 26, 2018

(54) BACKLIGHT MODULE AND DISPLAY DEVICE

(71) Applicants: BOE TECHNOLOGY GROUP CO., LTD., Beijing (CN); HEFEI XINSHENG OPTOELECTRONICS TECHNOLOGY CO., LTD., Hefei, Anhui (CN)

(72) Inventors: Zhanqi Xu, Beijing (CN); Jun Chen, Beijing (CN); Pengyu Zhang, Beijing (CN); Hongqiang Luo, Beijing (CN); Guiyu Zhang, Beijing (CN); Tao Ma, Beijing (CN)

(73) Assignees: BOE TECHNOLOGY GROUP CO., LTD., Beijing (CN); HEFEI XINSHENG OPTOELECTRONICS TECHNOLOGY CO., LTD., Hefei, Anhui (CN)

(*) Notice: Subject to any disclaimer, the term of this patent is extended or adjusted under 35 U.S.C. 154(b) by 99 days.

(21) Appl. No.: 15/106,010

(22) PCT Filed: Jan. 5, 2016

(86) PCT No.: PCT/CN2016/070096
§ 371 (c)(1),
(2) Date: Jun. 17, 2016

(87) PCT Pub. No.: WO2017/024752
PCT Pub. Date: Feb. 16, 2017

(65) Prior Publication Data
US 2017/0276863 A1 Sep. 28, 2017

(30) Foreign Application Priority Data
Aug. 12, 2015 (CN) .......................... 2015 1 0493705

(51) Int. Cl.
*F21V 7/04* (2006.01)
*F21V 8/00* (2006.01)

(52) U.S. Cl.
CPC .......... *G02B 6/0055* (2013.01); *G02B 6/0031* (2013.01); *G02B 6/0051* (2013.01); *G02B 6/0053* (2013.01)

(58) Field of Classification Search
CPC .. G02B 6/0055; G02B 6/0053; G02B 6/0031; G02B 6/0051; G02B 6/0056; G02B 6/0046; G02B 6/0091; G02B 6/0028; G02B 6/0038; G02F 1/133615
See application file for complete search history.

(56) References Cited

U.S. PATENT DOCUMENTS

| | | | |
|---|---|---|---|
| 2010/0246208 A1* | 9/2010 | Iwasaki | G02B 6/0041 362/582 |
| 2011/0221663 A1* | 9/2011 | Chiang | G09G 3/3413 345/102 |

FOREIGN PATENT DOCUMENTS

| | | |
|---|---|---|
| CN | 1396483 A | 2/2003 |
| CN | 101126860 A | 2/2008 |

(Continued)

OTHER PUBLICATIONS

Espacent english translation of JP 2005158669 A.*

(Continued)

*Primary Examiner* — Elmito Breval
*Assistant Examiner* — Omar Rojas Cadima
(74) *Attorney, Agent, or Firm* — Nath, Goldberg & Meyer; Joshua B. Goldberg

(57) ABSTRACT

The present invention belongs to the field of display technology, and particularly relates to a backlight module and a display device. The backlight module comprises a light source and a light guide plate, the light source being arranged at a light incident surface side of the light guide plate and a light guide pattern comprising a gap being (Continued)

arranged on a rear surface of the light guide plate opposite to a light-exiting surface of the light guide plate, wherein the backlight module further comprises a reflector unit that is used for reflecting light passing through the gap of the light guide pattern arranged on the rear surface of the light guide plate back into the light guide plate, so that the reflected light exits from the light-exiting surface of the light guide plate.

19 Claims, 4 Drawing Sheets

(56) References Cited

FOREIGN PATENT DOCUMENTS

| CN | 101266354 A | 9/2008 |
|---|---|---|
| CN | 101339329 A | 1/2009 |
| CN | 201242643 | 5/2009 |
| CN | 101858566 A | 10/2010 |
| CN | 102177447 A | 9/2011 |
| CN | 105093390 A | 11/2015 |
| EP | 0 674 133 A | 9/1995 |
| JP | 2005158669 A * | 6/2005 |

OTHER PUBLICATIONS

International Search Report dated Mar. 31, 2016 issued in corresponding International Application No. PCT/CN2016/070096 along with an English translation of the Written Opinion of the International Searching Authority.

First Office Action dated Sep. 4, 2017 in corresponding Chinese Patent Application No. 201510493705.6.

* cited by examiner

BACKLIGHT MODULE AND DISPLAY DEVICE

This is a National Phase Application filed under 35 U.S.C. 371 as a national stage of PCT/CN2016/070096, filed Jan. 5, 2016, an application claiming the benefit of Chinese Application No. 201510493705.6, filed on Aug. 12, 2015, the content of each of which is hereby incorporated by reference in its entirety.

FIELD OF THE INVENTION

The present invention relates to the field of display technology, and particularly to a backlight module and a display device.

BACKGROUND OF THE INVENTION

At present, flat display devices mainly include liquid crystal display devices and organic light-emitting diode (OLED) display devices. The liquid crystal display device has low power consumption, and gains popularity once it has been emerged.

The liquid crystal display device mainly includes a liquid crystal panel and a backlight module. The backlight module is a component that is arranged at a non-display side of the liquid crystal panel and used for providing a light source for the liquid crystal panel. Liquid crystal molecules are provided in the liquid crystal panel, which can be driven to rotate by an electric field, so that light transmittance of each pixel (color pixel, or black and white pixel) can be adjusted, thereby realizing image display. Since the liquid crystal molecule itself emits no light, the light-emitting performance of the backlight module may directly affect the display performance of the liquid crystal panel.

Light sources of backlight modules can be classified into three categories: a point light source, which mainly adopts an LED (Light-Emitting Diode) lamp as a light-emitting source and has advantages of long service life, low heat generation and the like, but has low brightness; a line light source, which mainly adopts a CCFL (Cold Cathode Fluorescent Lamp) as a light-emitting source and has advantages of high brightness, long service life and the like, but generates a large amount of heat; and a surface light source, which mainly adopts a VFD (Vacuum Fluorescence Display) as a light-emitting source and has advantages of high brightness, good uniformity and the like, but has high power consumption. At present, the backlight module mainly adopts the point light source as a light source, i.e., an LED lamp is used as a light source.

Generally, the backlight module having the point light source includes a light source, a light guide plate, a diffuser, a prismatic lens sheet and the like. The core technique of the backlight module is the optical design of the light guide plate, which can be classified into a flat-plate type and a wedge-shaped type according to its shape, and at present, the wedge-shaped light guide plates are widely adopted. The wedge-shaped light guide plate can achieve conversion from a point light source to a line light source or a surface light source. To achieve the consistencies of grayscale and uniformity, a light guide pattern on a rear surface of the light guide plate is usually arranged in a discontinuity manner, which includes opaque portions that are used for reflecting light to a light-exiting surface of the light guide plate and light-transmitting portions (gaps) arranged between the opaque portions. Part of light may pass through the gaps of the light guide pattern and be scattered to a rear side of the light guide plate (i.e., be away from the light-exiting surface), so that the real utilization of light is low. Moreover, power of the LED lamp has to be increased so as to achieve the expected brightness, so that energy is wasted and cost is high.

Therefore, how to design a backlight module having high light utilization becomes a technical problem to be solved urgently in the prior art.

SUMMARY OF THE INVENTION

In view of above shortcomings in the prior art, embodiments of the present invention provide a backlight module and a display device. Light emitted from a light source of the backlight module can be utilized sufficiently, so that the light utilization of the backlight module is improved, the energy consumption is lowered and the cost is saved.

According to an embodiment of the present invention, there is provided a backlight module, comprising a light source and a light guide plate, the light source being arranged at a light incident surface side of the light guide plate and a light guide pattern comprising a gap being arranged on a rear surface of the light guide plate opposite to a light-exiting surface of the light guide plate, wherein the backlight module further comprises a reflector unit that is used for reflecting light passing through the gap of the light guide pattern arranged on the rear surface of the light guide plate back into the light guide plate, so that the reflected light exits from the light-exiting surface of the light guide plate.

Preferably, the reflector unit comprises a reflector plate and a set of reflectors, wherein a reflecting surface of the reflector plate is arranged to be opposite to the rear surface of the light guide plate, and an effective area of the reflecting surface of the reflector plate is not smaller than an area of the rear surface of the light guide plate; and the set of the reflectors comprises a first reflector and a second reflector, which are arranged at a same side of the light guide plate and the reflector plate, at least a part of a reflecting surface of the first reflector and at least a part of a reflecting surface of the second reflector are capable of receiving and reflecting light reflected from each other, such that the light passing through the gap of the light guide pattern arranged on the rear surface of the light guide plate can enter the light guide plate from the light incident surface of the light guide plate after being successively reflected by the reflector plate, the first reflector and the second reflector.

Preferably, the rear surface of the light guide plate is arranged in an inclination manner with respect to the light-exiting surface of the light guide plate, and the light guide plate is of a structure in which a thickness thereof is gradually decreased from a side close to the light source to a side away from the light source;

the reflecting surface of the reflector plate is arranged to be opposite to the rear surface of the light guide plate;

the reflector plate is of a cuboid-shaped structure, or the reflector plate is of a structure in which a thickness thereof is gradually increased from the side close to the light source to the side away from the light source.

Preferably, the first reflector, the second reflector and the light source are arranged at a same side of the light guide plate, a bottom end of the first reflector is not lower than the reflecting surface of the reflector plate, and a top end of the second reflector is not higher than the light-exiting surface of the light guide plate.

Preferably, the first reflector and the second reflector are oppositely arranged at two sides of the light source, and an included angle between the reflecting surface of the first reflector and the reflecting surface of the second reflector is smaller than 180°.

Preferably, an included angle between the reflecting surface of the first reflector and a plane parallel to the light-exiting surface of the light guide plate is ranged from 100° to 170°, and an included angle between the reflecting surface of the second reflector and a plane parallel to the light-exiting surface of the light guide plate is ranged from 10° to 80°.

Preferably, the included angle between the reflecting surface of the first reflector and the plane parallel to the light-exiting surface of the light guide plate is 150°, and the included angle between the reflecting surface of the second reflector and the plane parallel to the light-exiting surface of the light guide plate is 45°.

Preferably, the first and second reflectors are plane mirrors or total reflection optical films.

Preferably, the reflector unit comprises a concave light-gathering plate, a concave surface of which is arranged to be opposite to the rear surface of the light guide plate, wherein a focal point of the concave light-gathering plate is located inside the light guide plate and a region of the rear surface of the light guide plate corresponding to the focal point is the gap of the light guide pattern.

Preferably, radian of the concave surface of the concave light-gathering plate is ranged from 5° to 10°.

Preferably, the backlight module further comprises a diffuser and a prismatic lens sheet, wherein the diffuser is provided at a light-exiting surface side of the light guide plate, and the prismatic lens sheet is provided at a side of the diffuser that is away from the light guide plate.

According to an embodiment of the present invention, there is provided a display device, comprising above backlight module.

The present invention has following the beneficial effects: the backlight module has a high light utilization, and the cost is saved; particularly, for a portable mobile display device, it is possible to reduce energy consumption and prolong standby time of the display device.

DETAILED DESCRIPTION OF THE EMBODIMENTS

To make those skilled in the art better understand the technical solution of the present invention, the backlight module and the display device of the present invention will be described below in detail in conjunction with the accompanying drawings and specific embodiments.

First Embodiment

The present embodiment provides a backlight module, a light source of which is a edge-type light source, i.e., the light source is arranged at a side surface of a light guide plate. By arranging a reflector unit therein, the backlight module can significantly improve utilization of the light emitted from the light source on the premise of ensuring the consistencies of grayscale and uniformity.

Figure 1:
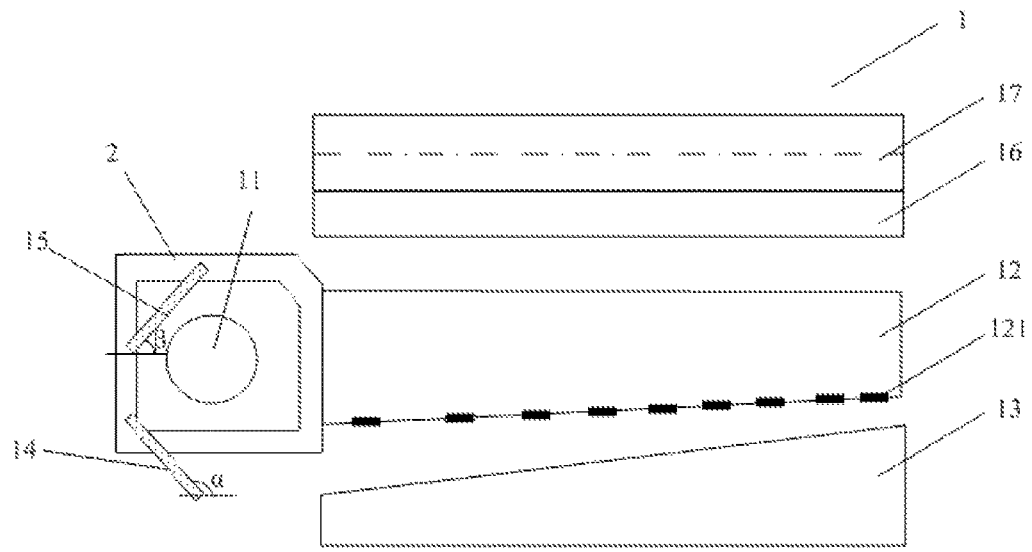
FIG. 1 is a structural section view of a backlight module provided by a first embodiment of the present invention.

FIG. 1 is a structural section view of the backlight module provided by the present embodiment. As shown in FIG. 1, the backlight module comprises a light source 11, a light guide plate 12, a diffuser 16, a prismatic lens sheet 17 and a reflector unit. The diffuser 16 is arranged at a light-exiting surface side of the light guide plate 12, the prismatic lens sheet 17 is arranged at a side of diffuser 16 that is away from the light guide plate 12, and the light source 11 is arranged at a light incident surface side of the light guide plate 12 (i.e., the light source 11 is arranged at a side surface of the light guide plate 12). In the present embodiment, a rear surface of the light guide plate 12 opposite to the light-exiting surface of the light guide plate 12 is provided with a light guide pattern 121. To achieve the consistencies of grayscale and uniformity, the light guide pattern is arranged in a discontinuity manner, which includes opaque portions that are used for reflecting light to the light-exiting surface of the light guide plate and light-transmitting portions (gaps) arranged between the opaque portions. The reflector unit is used for reflecting light passing through the gap of the light guide pattern 121 arranged on the rear surface of the light guide plate 12 back into the light guide plate 12, so that the reflected light exits from the light-exiting surface of the light guide plate 12.

Specifically, the reflector unit of the present embodiment comprises a reflector plate 13 and a set of reflectors, in which a reflecting surface of the reflector plate 13 is arranged to be opposite to the rear surface of the light guide plate 12, preferably arranged approximately parallel thereto, and an effective area of the reflecting surface of the reflector plate 13 is not smaller than an area of the rear surface of the light guide plate 12. The set of the reflectors comprises a first reflector 14 and a second reflector 15, which are arranged at a same side of the light guide plate 12 and the reflector plate 13. At least a part of a reflecting surface of the first reflector 14 and at least a part of a reflecting surface of the second reflector 15 can receive and reflect light reflected from each other, such that the light passing through the gaps of the light guide pattern 121 arranged on the rear surface of the light guide plate 12 can enter the light guide plate 12 from the light incident surface of the light guide plate 12 after being successively reflected by the reflector plate 13, the first reflector 14 and the second reflector 15.

Preferably, the rear surface of the light guide plate 12 is arranged in an inclination manner with respect to the light-exiting surface of the light guide plate 12, and the light guide plate 12 is of a structure in which a thickness thereof is gradually decreased from a side close to the light source 11 to a side away from the light source 11, that is, the light guide plate 12 is of a wedge-shaped structure. Similar to the shape of the light guide plate 12, the reflector plate 13 is also of a wedge-shaped structure, and the reflector plate 13 is of a structure in which a thickness thereof is gradually increased from the side close to the light source 11 to the side away from the light source 11. The size of the reflector plate 13 may be larger than that of the light guide plate 12, for example, the reflector plate 13 may be extended from an area corresponding to the light guide plate 12 to an area under the light source 11, so as to most possibly prevent any light passing through the rear surface of the light guide plate 12 from missing. Moreover, the specific distance between the light guide plate 12 and the reflector plate 13 is defined by a light guide path, and can be adjusted according to design requirements. Since the rear surface of the light guide plate 12 and the reflecting surface of the reflector plate 13 are arranged oppositely and approximately parallel to each other, it can be ensured that both the light in a direction vertical to the reflecting surface of the reflector plate 13 and the light in a direction inclined to the reflecting surface of the reflector plate 13 can be reflected back into the light guide plate 12 and are reused, thereby improving the utilization of the light emitted from the light source 11.

Here, the first reflector 14 and the second reflector 15 may be of a strip shape, and may be arranged at a same side of the light guide plate 12 where the light source 11 is arranged, that is, may be arranged at the light incident surface side of the light guide plate 12. A bottom end of the first reflector 14 is not lower than the reflecting surface of the reflector plate 13, and a top end of the second reflector 15 is not higher than the light-exiting surface of the light guide plate 12.

As shown in FIG. 1, the first reflector 14 and the second reflector 15 are arranged at the light incident surface side of the light guide plate 12 and are oppositely arranged at two sides of the light source 11, and an included angle between the reflecting surface of the first reflector 14 and the reflecting surface of the second reflector 15 is smaller than 180°. In the present embodiment, the light source 11 is preferably an LED light bar, the first reflector 14 and second reflector 15 are preferably plane mirrors or total reflection optical films, and the first reflector 14 and the second reflector 15 are preferably fixed at the two sides of the light source 11 by using a frame sealant.

Figure 7:
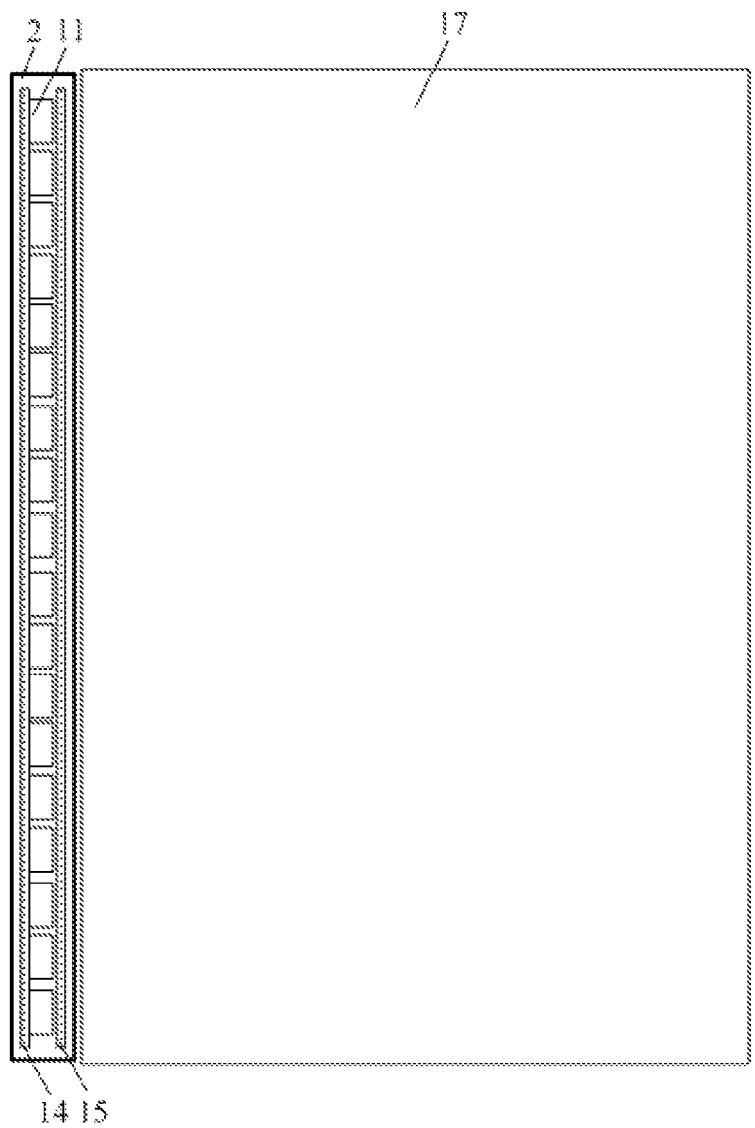
FIG. 7 is an assembly diagram of the backlight module of FIG. 1.

Preferably, an included angle α between the reflecting surface of the first reflector 14 and a plane parallel to the light-exiting surface of the light guide plate 12 is ranged from 100° to 170°, and an included angle β between the reflecting surface of the second reflector 15 and a plane parallel to the light-exiting surface of the light guide plate 12 is ranged from 10° to 80°. FIG. 7 is an assembly diagram of the backlight module of FIG. 1. As shown in FIG. 7, based on the inclined rear surface of the light guide plate 12 and the inclined reflecting surface of the reflector plate 13 (both are located under the prismatic lens sheet 17), the first reflector 14 and the second reflector 15 are fixed on the frame 2 at certain angles (it is possible to arrange the reflectors on the frame 2 along with the light source 11, for example, the reflectors are embedded in the same direction as an LED light bar (as a light source 11) in accordance with its lengthwise direction), so as to ensure that, after several reflections, the light may be exactly incident onto the opaque portions of the light guide pattern 121 arranged on the rear surface of the light guide plate 12.

Further preferably, the included angle α between the reflecting surface of the first reflector 14 and the plane parallel to the light-exiting surface of the light guide plate 12 is 150°, and the included angle β between the reflecting surface of the second reflector 15 and the plane parallel to the light-exiting surface of the light guide plate 12 is 45°. That is, as shown in FIG. 1, the included angle α in relation to the first reflector 14 is adjusted to be 150° and the included angle β in relation to the second reflector 15 is adjusted to be 45°, such that the light entering into the light guide plate 12 from the second reflector 15 is exactly reflected onto the opaque portions of the light guide pattern 121 arranged on the rear surface of the light guide plate 12.

Figure 2:
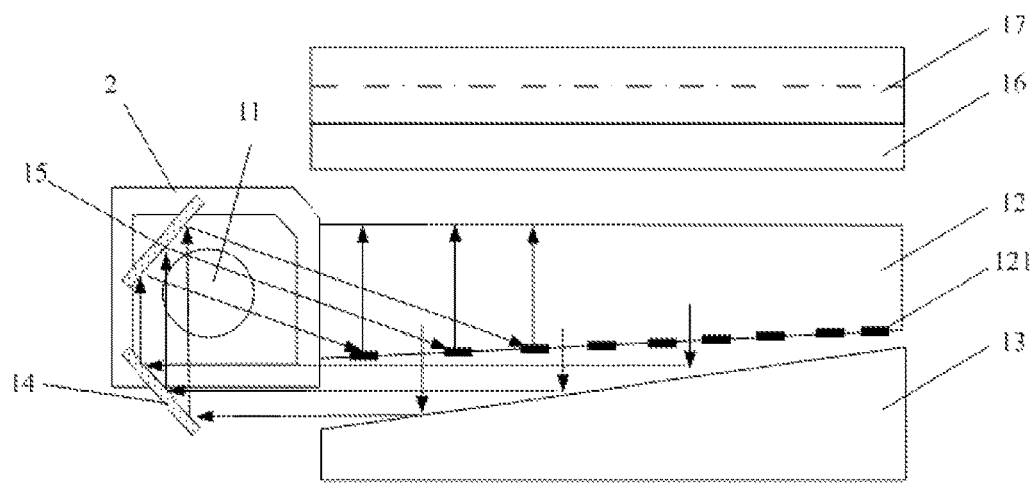
FIG. 2 is a schematic diagram illustrating a light path in the backlight module of FIG. 1.

FIG. 2 is a schematic diagram illustrating a light path of the backlight module of FIG. 1. The operation principle of the backlight module in the present embodiment will be described as below with reference to FIG. 2.

Light is emitted from the light source 11 and enters into the light guide plate 12 through the side surface (i.e., light incident surface) of the light guide plate 12, and after that, a portion of the light is reflected by the opaque portions of the light guide pattern 121 arranged on the rear surface of the light guide plate 12 and then exits from the light-exiting surface of the light guide plate 12 (this portion of the light is an effective portion that is being directly utilized), while the other portion of the light passes through the light-transmitting portions (gaps) of the light guide pattern 121 and enters into an area between the light guide plate 12 and the reflector plate 13 (which are of wedge-shaped structures in this embodiment).

The light that enters into the area between the light guide plate 12 and the reflector plate 13 is then reflected (i.e., a first refelction) by the reflecting surface of the reflector plate 13, so that a portion of the light (now shown) returns back into the light guide plate 12 through the gaps and then exits from the light-exiting surface of the light guide plate 12, and the other portion of the light is reflected, by the reflecting surface of the reflector 13, onto the reflecting surface of the first reflector 14 arranged at one side of the light source 11.

The light that is reflected onto the reflecting surface of the first reflector 14 is reflected (i.e., a second reflection), by the first reflector 14, onto the reflecting surface of the second reflector 15 opposite to the reflecting surface of the first reflector 14.

The light that is reflected onto the reflecting surface of the second reflector 15 is reflected (i.e., a third reflection) by the second reflector 15, enters into the light guide plate 12 through the side surface (i.e., light incident surface) of the light guide plate 12, and is reflected exactly onto the opaque portions of the light guide pattern 121 arranged on the rear surface of the light guide plate 12, so as to be reflected to the light-exiting surface of the light guide plate 12. The process is repeated, so that the light passing through the rear surface of the light guide plate 12 can be utilized as well, the utilization of light emitted from the light source 11 is improved, the brightness of the backlight module is increased, and the energy consumption is lowered.

According to the backlight module provided by the present embodiment, it can be seen that, by arranging a reflector unit (comprising the wedge-shaped reflector plate and the set of the reflectors which are arranged oppositely at two sides of the light source and are fixed at certain angles), the light passing through the gaps of the light guide pattern arranged on the rear surface of the light guide plate is ensured to arrive at the opaque portions of the light guide pattern after several reflections, so as to be reflected to the light-exiting surface of the light guide plate, so that the light emitted from the light source is sufficiently utilized, and the light utilization of the backlight module is improved. Moreover, under a same brightness condition, the backlight module can adopt a low power LED lamp as the light source, so that the energy consumption is lowered and the cost is saved.

Second Embodiment

The present embodiment provides a backlight module, which can significantly improve utilization of light emitted from a light source on the premise of ensuring the consistencies of grayscale and uniformity by providing a reflector unit in the backlight module. The structure of a reflector plate included in the reflector unit in the present embodiment is different from that of the reflector plate in the first embodiment.

Figure 3:
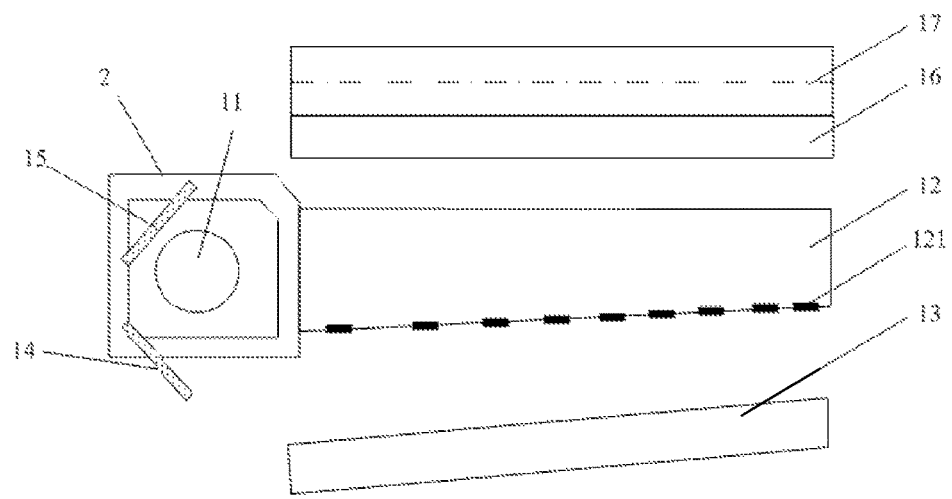
FIG. 3 is a structural section view of a backlight module provided by a second embodiment of the present invention.

FIG. 3 is a structural section view of the backlight module provided by the present embodiment. As shown in FIG. 3, the reflector plate 13 is of a cuboid-shaped structure, and a reflecting surface of the reflector plate 13 is arranged to be opposite to a rear surface of a light guide plate 12.

Figure 4:
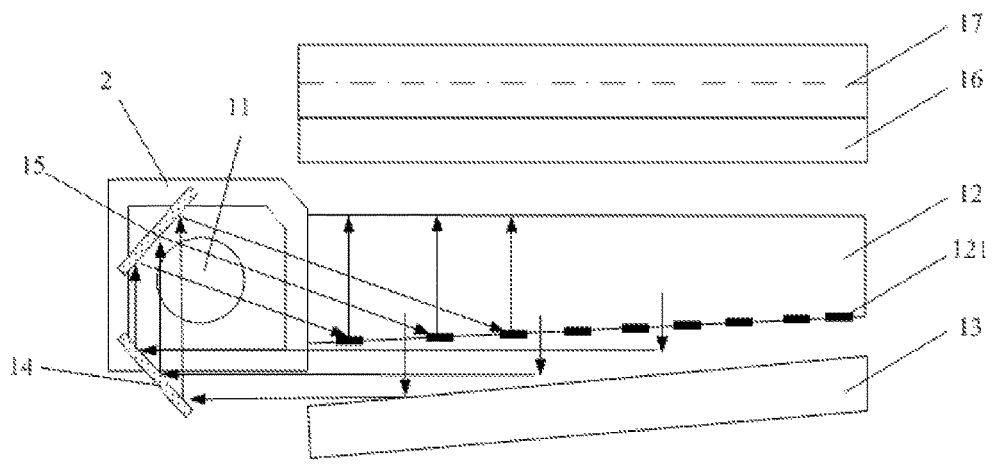
FIG. 4 is a schematic diagram illustrating a light path in the backlight module of FIG. 3.

The cuboid-shape based reflector and the wedge-shape based reflector have the same reflecting surface. FIG. 4 is a schematic diagram illustrating a light path in the backlight module of FIG. 3. As shown in FIG. 4, the operation principle of the backlight module in the present embodiment is the same as that of the backlight module in the first embodiment, and will not be repeated herein.

Other structures of the backlight module in the present embodiment are the same as those of the backlight module in the first embodiment, and will not be repeated herein.

According to the backlight module provided by the present embodiment, it can be seen that, by arranging a reflector unit (comprising the cuboid-shaped reflector plate and the set of the reflectors which are arranged oppositely at two sides of the light source and are fixed at certain angles), the light passing through the gaps of the light guide pattern arranged on the rear surface of the light guide plate is ensured to arrive at the opaque portions of the light guide pattern after several reflections, so as to be reflected to the light-exiting surface of the light guide plate, so that the light emitted from the light source is sufficiently utilized, and the light utilization of the backlight module is improved. Moreover, under a same brightness condition, the backlight module can adopt a low power LED lamp as the light source, so that the energy consumption is lowered and the cost is saved.

Third Embodiment

The present embodiment provides a backlight module, which can significantly improve utilization of light emitted from a light source on the premise of ensuring the consistencies of grayscale and uniformity by providing a reflector unit in the backlight module. The structure of a reflector plate included in the reflector unit in the present embodiment is different from that of the reflector plate in the first or second embodiment.

Figure 5:
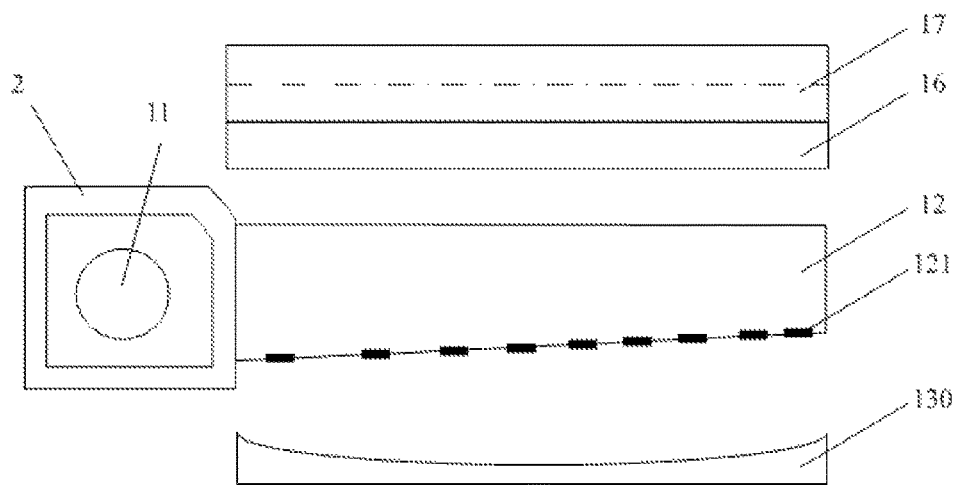
FIG. 5 is a structural section view of a backlight module provided by a third embodiment of the present invention.

FIG. 5 is a structural section view of the backlight module provided by the present embodiment. As shown in FIG. 5, the reflector unit in the present embodiment comprises a concave light-gathering plate 130, a concave surface of which is arranged to be opposite to a rear surface of the light guide plate 12 and used for reflecting and gathering the light passing through the gaps of the light guide pattern 121. In the present embodiment, a focal point of the concave light-gathering plate 130 (i.e., a focus point of the light reflected from the plate 130) is located in the light guide plate 12. In this case, in order to prevent the light path from being blocked, an area on the rear surface of the light guide plate 12 corresponding to the focal point will be designed as a light-transmitting portion (gap) of the light guide pattern 121 when the light guide plate 12 is designed.

Preferably, the focal point of the concave light-gathering plate 130 corresponds to a center of the light guide plate 12, and a central area of the rear surface of the light guide plate 12 corresponding to the focal point is a gap of the light guide pattern 121. At this time, the center of the concave surface of the concave light-gathering plate 130 is located in a same straight line as the plane center of the rear surface of the light guide plate 12, so as to ensure the light is reflected to and gathered at the center of the light guide plate 12. Compared with the first and second embodiments, the backlight module in the present embodiment adopts the concave reflecting surface to replace the flat reflecting surface, so as to achieve a better light gathering effect. Meanwhile, since the set of the reflectors is omitted, the structure is simple.

Preferably, radian of the concave surface of the concave light-gathering plate 130 is ranged from 5° to 10°. With the concave structure having a small radian, it is possible to gather the light from a large area.

Figure 6:
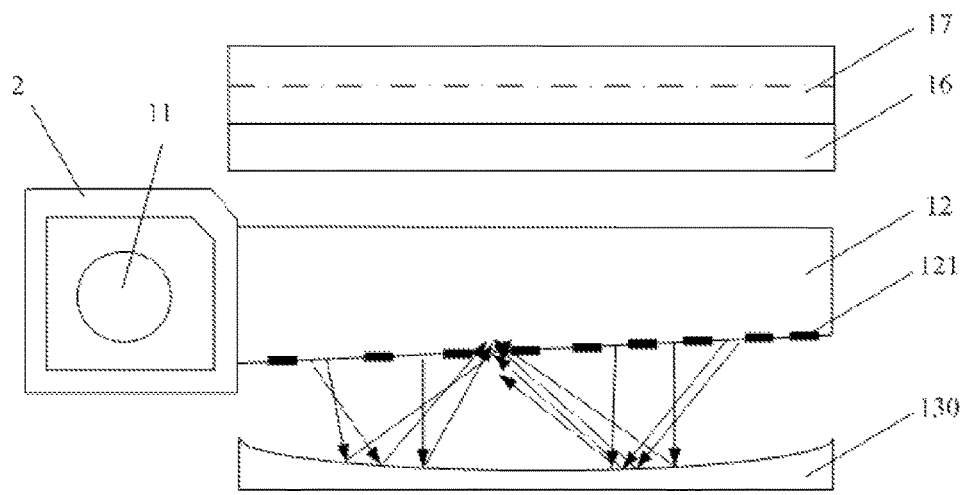
FIG. 6 is a schematic diagram illustrating a light path in the backlight module of FIG. 5.

FIG. 6 is a schematic diagram illustrating a light path in the backlight module of FIG. 5. The operation principle of the backlight module in the present embodiment will be described below with reference to FIG. 6.

Light is emitted from the light source 11 and enters into the light guide plate 12 through the side surface (i.e., light incident surface) of the light guide plate 12, and after that, a portion of the light is reflected by the opaque portions of the light guide pattern 121 arranged on the rear surface of the light guide plate 12 and then exits from the light-exiting surface of the light guide plate 12 (this portion of the light is an effective portion that is being directly utilized), while the other portion of the light passes through the gaps of the light guide pattern 121 and enters into an area between the light guide plate 12 and the concave light-gathering plate 130.

The light that enters into the area between the light guide plate 12 and the concave light-gathering plate 130 is reflected by the concave light-gathering plate 130. As described above, the focal point of the concave light-gathering plate 130 is located in the light guide plate 12, such that the portion of the light returns into the light guide plate 12 through the gap of the light guide pattern 121 arranged on the rear surface of the light guide plate 12 and exits from the light-exiting surface of the light guide plate 12, therefore, the portion of the light can be utilized as well, the utilization of the light emitted from the light source 11 is improved, the brightness of the backlight module is increased, and the energy consumption is lowered.

According to the backlight module provided by the present embodiment, by arranging the concave light-gathering plate 130, the light passing through the gaps of the light guide pattern arranged on the rear surface of the light guide plate is reflected to and gathered at the centre inside the light guide plate 12 and then exits from the light-exiting surface of the light guide plate 12, so that effective utilization of the light is realized, and the light utilization in the backlight module is improved. Moreover, under a same brightness condition, the backlight module can adopt a low power LED lamp as the light source, so that the energy consumption is lowered and the cost is saved.

Other structures of the backlight module in the present embodiment are the same as those of the backlight module in the first embodiment, and will not be repeated herein.

According to the backlight modules in the first to third embodiment, the problem of low utilization of the light emitted from the light source in the backlight module is solved by providing a reflector unit, so that a high light utilization is realized, the energy consumption is lowered, and the cost is also reduced.

Fourth Embodiment

The present embodiment provides a display device, comprising the backlight module in any one of the first to third embodiments.

The display device may be any product or part with a display function, such as a liquid crystal panel, an electronic paper, a mobile phone, a tablet computer, a television, a display, a laptop computer, a digital frame, a navigator or the like.

Under a same brightness condition, the light emitted from the light source can be sufficiently utilized by adopting the backlight module in the first to third embodiments, so that the light utilization in the backlight module is improved, a low power LED lamp can be adopted as a light source, and the cost is saved accordingly; particularly, for a portable mobile display device, it is possible to reduce energy consumption and prolong standby time of the display device.

It could be understood that the above embodiments are merely exemplary embodiments adopted for describing the principle of the present invention, but the present invention is not limited thereto. Various variations and improvements may be made for those with ordinary skill in the art without departing from the spirit and essence of the present invention, and these variations and improvements shall also fall within the protection scope of the present invention.

What is claimed is:

1. A backlight module, comprising a light source and a light guide plate, the light source being arranged at a light incident surface side of the light guide plate and a light guide pattern comprising a gap being arranged on a rear surface of the light guide plate opposite to a light-exiting surface of the light guide plate, wherein the backlight module further comprises a reflector unit that is used for reflecting light passing through the gap of the light guide pattern arranged on the rear surface of the light guide plate back into the light guide plate, so that the reflected light exits from the light-exiting surface of the light guide plate, wherein the reflector unit comprises a reflector plate and a set of reflectors, wherein a reflecting surface of the reflector plate is arranged to be opposite to the rear surface of the light guide plate, and an effective area of the reflecting surface of the reflector plate is not smaller than an area of the rear surface of the light guide plate; and wherein the set of the reflectors comprises a first reflector and a second reflector, which are arranged at a same side of the light guide plate and the reflector plate, the first reflector is arranged to be closer to the reflector plate than the second reflector, and at least a part of a reflecting surface of the first reflector and at least a part of a reflecting surface of the second reflector are capable of receiving and reflecting light reflected from each other, such that the light passing through the gap of the light guide pattern arranged on the rear surface of the light guide plate enters the light guide plate from the light incident surface of the light guide plate after being successively reflected by the reflector plate, the first reflector and the second reflector.

2. The backlight module according to claim 1, wherein the rear surface of the light guide plate is arranged in an inclination manner with respect to the light-exiting surface of the light guide plate, and the light guide plate is of a structure in which a thickness thereof is gradually decreased from a side close to the light source to a side away from the light source;
the reflecting surface of the reflector plate is arranged to be opposite to the rear surface of the light guide plate;
the reflector plate is of a cuboid-shaped structure, or the reflector plate is of a structure in which a thickness thereof is gradually increased from the side close to the light source to the side away from the light source.

3. The backlight module according to claim 1, wherein the first reflector, the second reflector and the light source are arranged at a same side of the light guide plate, a bottom end of the first reflector is not lower than the reflecting surface of the reflector plate, and a top end of the second reflector is not higher than the light-exiting surface of the light guide plate.

4. The backlight module according to claim 1, wherein the first reflector and the second reflector are oppositely arranged at two sides of the light source, and an included angle between the reflecting surface of the first reflector and the reflecting surface of the second reflector is smaller than 180°.

5. The backlight module according to claim 4, wherein a first included angle between the reflecting surface of the first reflector and a first plane parallel to the light-exiting surface of the light guide plate is ranged from 100° to 170°, and a second included angle between the reflecting surface of the second reflector and a second plane parallel to the light-exiting surface of the light guide plate is ranged from 10° to 80°.

6. The backlight module according to claim 5, wherein the first included angle between the reflecting surface of the first reflector and the first plane parallel to the light-exiting surface of the light guide plate is 150°, and the second included angle between the reflecting surface of the second reflector and the second plane parallel to the light-exiting surface of the light guide plate is 45°.

7. The backlight module according to claim 1, wherein the first and second reflectors are plane mirrors or total reflection optical films.

8. The backlight module according to claim 1, wherein the backlight module further comprises a diffuser and a prismatic lens sheet, wherein the diffuser is provided at the light-exiting surface side of the light guide plate, and the prismatic lens sheet is provided at a side of the diffuser that is away from the light guide plate.

9. The backlight module according to claim 1, wherein an orthographic projection of the first reflector on a third plane perpendicular to the backlight module at least partially overlaps with an orthographic projection of the reflecting surface of the reflector plate on the third plane perpendicular to the backlight module.

10. The backlight module according to claim 1, wherein an orthographic projection of the first reflector on a third plane perpendicular to the backlight module substantially covers an orthographic projection of the reflecting surface of the reflector plate on the third plane perpendicular to the backlight module.

11. A display device, comprising a backlight module, which comprises a light source and a light guide plate, the light source being arranged at a light incident surface side of the light guide plate and a light guide pattern comprising a gap being arranged on a rear surface of the light guide plate opposite to a light-exiting surface of the light guide plate, wherein the backlight module further comprises a reflector unit that is used for reflecting light passing through the gap of the light guide pattern arranged on the rear surface of the light guide plate back into the light guide plate, so that the reflected light exits from the light-exiting surface of the light guide plate, wherein the reflector unit comprises a reflector plate and a set of reflectors, wherein a reflecting surface of the reflector plate is arranged to be opposite to the rear surface of the light guide plate, and an effective area of the reflecting surface of the reflector plate is not smaller than an area of the rear surface of the light guide plate; and wherein the set of the reflectors comprises a first reflector and a second reflector, which are arranged at a same side of the light guide plate and the reflector plate, the first reflector is arranged to be closer to the reflector plate than the second reflector, and at least a part of a reflecting surface of the first reflector and at least a part of a reflecting surface of the second reflector are capable of receiving and reflecting light reflected from each other, such that the light passing through the gap of the light guide pattern arranged on the rear surface of the light guide plate enters the light guide plate from the light incident surface of the light guide plate after being successively reflected by the reflector plate, the first reflector and the second reflector.

12. The display device according to claim 11, wherein
the rear surface of the light guide plate is arranged in an inclination manner with respect to the light-exiting surface of the light guide plate, and the light guide plate is of a structure in which a thickness thereof is gradually decreased from a side close to the light source to a side away from the light source;
the reflecting surface of the reflector plate is arranged to be opposite to the rear surface of the light guide plate;
the reflector plate is of a cuboid-shaped structure, or the reflector plate is of a structure in which a thickness thereof is gradually increased from the side close to the light source to the side away from the light source.

13. The display device according to claim 11, wherein the first reflector, the second reflector and the light source are arranged at a same side of the light guide plate, a bottom end of the first reflector is not lower than the reflecting surface of the reflector plate, and a top end of the second reflector is not higher than the light-exiting surface of the light guide plate.

14. The display device according to claim 11, wherein the first reflector and the second reflector are oppositely arranged at two sides of the light source, and an included angle between the reflecting surface of the first reflector and the reflecting surface of the second reflector is smaller than 180°.

15. The display device according to claim 14, wherein a first included angle between the reflecting surface of the first reflector and a first plane parallel to the light-exiting surface of the light guide plate is ranged from 100° to 170°, and a second included angle between the reflecting surface of the second reflector and a second plane parallel to the light-exiting surface of the light guide plate is ranged from 10° to 80°.

16. The display device according to claim 15, wherein the first included angle between the reflecting surface of the first reflector and the first plane parallel to the light-exiting surface of the light guide plate is 150°, and the second included angle between the reflecting surface of the second reflector and the second plane parallel to the light-exiting surface of the light guide plate is 45°.

17. The display device according to claim 11, wherein the first and second reflectors are plane mirrors or total reflection optical films.

18. The display device according to claim 11, wherein an orthographic projection of the first reflector on a third plane perpendicular to the backlight module at least partially overlaps with an orthographic projection of the reflecting surface of the reflector plate on the third plane perpendicular to the backlight module.

19. The display device according to claim 11, wherein an orthographic projection of the first reflector on a third plane perpendicular to the backlight module substantially covers an orthographic projection of the reflecting surface of the reflector plate on the third plane perpendicular to the backlight module.

* * * * *